(12) United States Patent
Chan et al.

(10) Patent No.: US 9,343,715 B2
(45) Date of Patent: May 17, 2016

(54) EXTENDED BATTERY

(71) Applicant: ZeroLemon LLC, Cheyenne, WY (US)

(72) Inventors: Stephen Ching Yat Chan, Hong Kong (HK); Wei Chen, Shenzhen (CN)

(73) Assignee: ZEROLEMON LLC, Cheyenne, WY (US)

(*) Notice: Subject to any disclaimer, the term of this patent is extended or adjusted under 35 U.S.C. 154(b) by 160 days.

(21) Appl. No.: 14/048,005

(22) Filed: Oct. 7, 2013

(65) Prior Publication Data

US 2015/0099144 A1    Apr. 9, 2015

(51) Int. Cl.
*H01M 2/10* (2006.01)
*H01M 10/04* (2006.01)
*H01M 10/42* (2006.01)

(52) U.S. Cl.
CPC .......... *H01M 2/1061* (2013.01); *H01M 2/1066* (2013.01); *H01M 10/0445* (2013.01); *H01M 10/425* (2013.01); H01M 2220/30 (2013.01); Y10T 29/49108 (2015.01)

(58) Field of Classification Search
CPC ............ H01M 2/1061; H01M 2/1066; H01M 10/0445; H01M 10/425
USPC ............................................................. 429/7
See application file for complete search history.

(56) References Cited

U.S. PATENT DOCUMENTS

| 2002/0142194 A1* | 10/2002 | Hong .................. H01M 2/1086 429/7 |
| 2005/0129989 A1* | 6/2005 | Edwards ................ H01L 23/58 429/7 |

* cited by examiner

*Primary Examiner* — Helen O Conley
(74) *Attorney, Agent, or Firm* — Rabin & Berdo, P.C.

(57) ABSTRACT

A battery for use in an electronic device having a user-accessible battery compartment, including a connection module accommodatable in the battery compartment, and an extension module attached to and in electrical connection with the connection module. The extension module is larger than the battery compartment, such that, when the battery in installed, the connection module is disposed in the battery compartment, and the extension module covers the battery compartment and a portion of the electronic device other than the battery compartment.

14 Claims, 5 Drawing Sheets

EXTENDED BATTERY

BACKGROUND

1. Technical Field

The present invention relates to a battery. More specifically, it relates to an extended battery for use in an electronic device, and the methods of manufacturing and using the extended battery.

2. Background Information

Many electronic devices use batteries as their primary power sources (e.g. cellphones, cameras), or as secondary power sources (e.g. laptop computers). A battery is normally attached, in a removable manner, to a battery compartment formed at the back of the housing of an electronic device, to thereby provide power to the electronic device. The operation (including standing-by) of the electronic device will gradually drain up the battery, which is then replaced and/or recharged before it is again used to power up the device.

Frequent replacement or recharging of the battery, however, is inconvenient, and sometimes infeasible, especially for portable electronic devices such as cellphones. Thus, it is often desirable to increase the capacity of the battery used in an electronic device, so that a longer battery life can be obtained.

One way to increase the capacity of a battery is to increase the energy density of the battery, which, however, is not only costly but also limited by the technological advancement in pertinent technical areas.

This invention provides an alternative solution to the problem, and makes it possible to increase the capacity of a battery without increasing its energy density.

SUMMARY

A battery for use in an electronic device that has a user-accessible battery compartment, including a connection module accommodatable in the battery compartment, and an extension module attached to and in electrical connection with the connection module. The extension module is larger than the battery compartment, such that, when the battery in installed, the connection module is disposed in the battery compartment, and the extension module covers the battery compartment and a portion of the electronic device other than the battery compartment.

DETAILED DESCRIPTION

Figure 1:
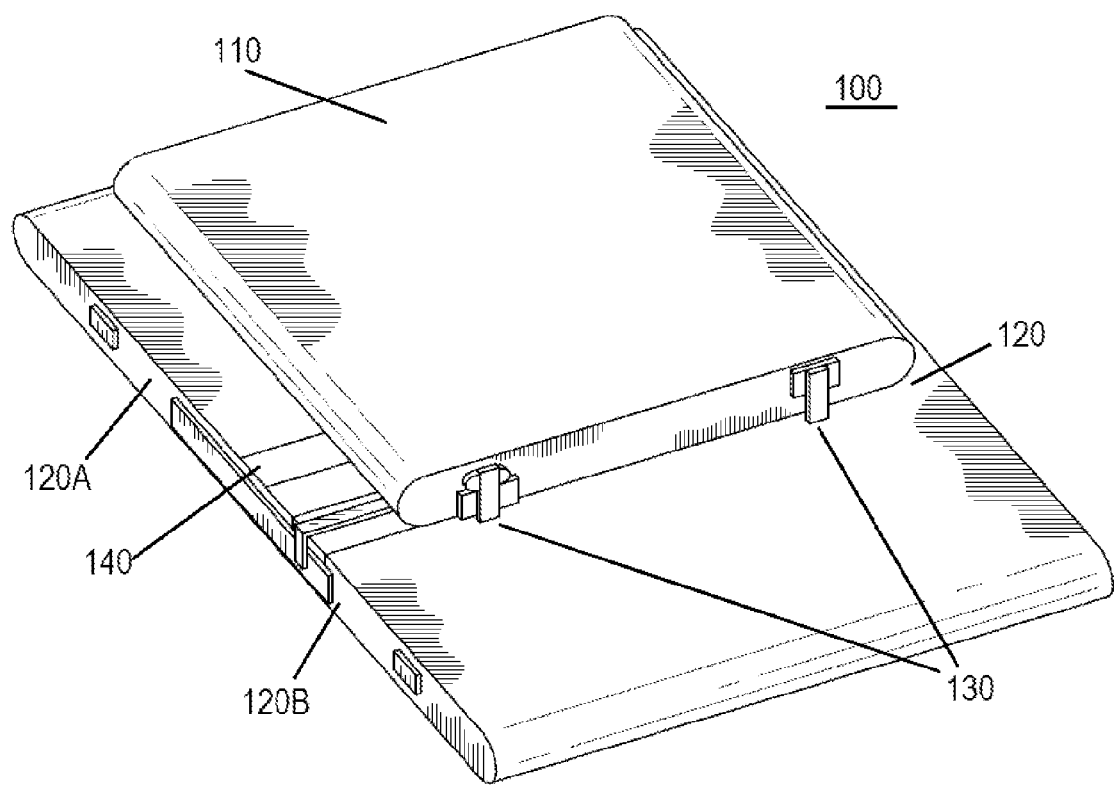
FIG. 1 illustrates an embodiment of a battery for use in an electronic device that has a user-accessible battery compartment.

The invention will now be described in more detail by way of example with reference to the embodiments shown in the accompanying Figures. It should be kept in mind that the following described embodiments are only presented by way of example and should not be construed as limiting the inventive concept to any particular physical configuration. Further, if used and unless otherwise stated, the terms "upper," "lower," "front," "back," "over," "under," and similar such terms are not to be construed as limiting the invention to a particular orientation. Instead, these terms are used only on a relative basis. Like reference numerals may designate like elements throughout the specification.

In the present invention, a battery for use in an electronic device (such as a cellphone) is manufactured and used in a way to increase its power capacity, while maintaining its footprint within the limits of the physical dimensions of the corresponding electronic device.

Figure 2:
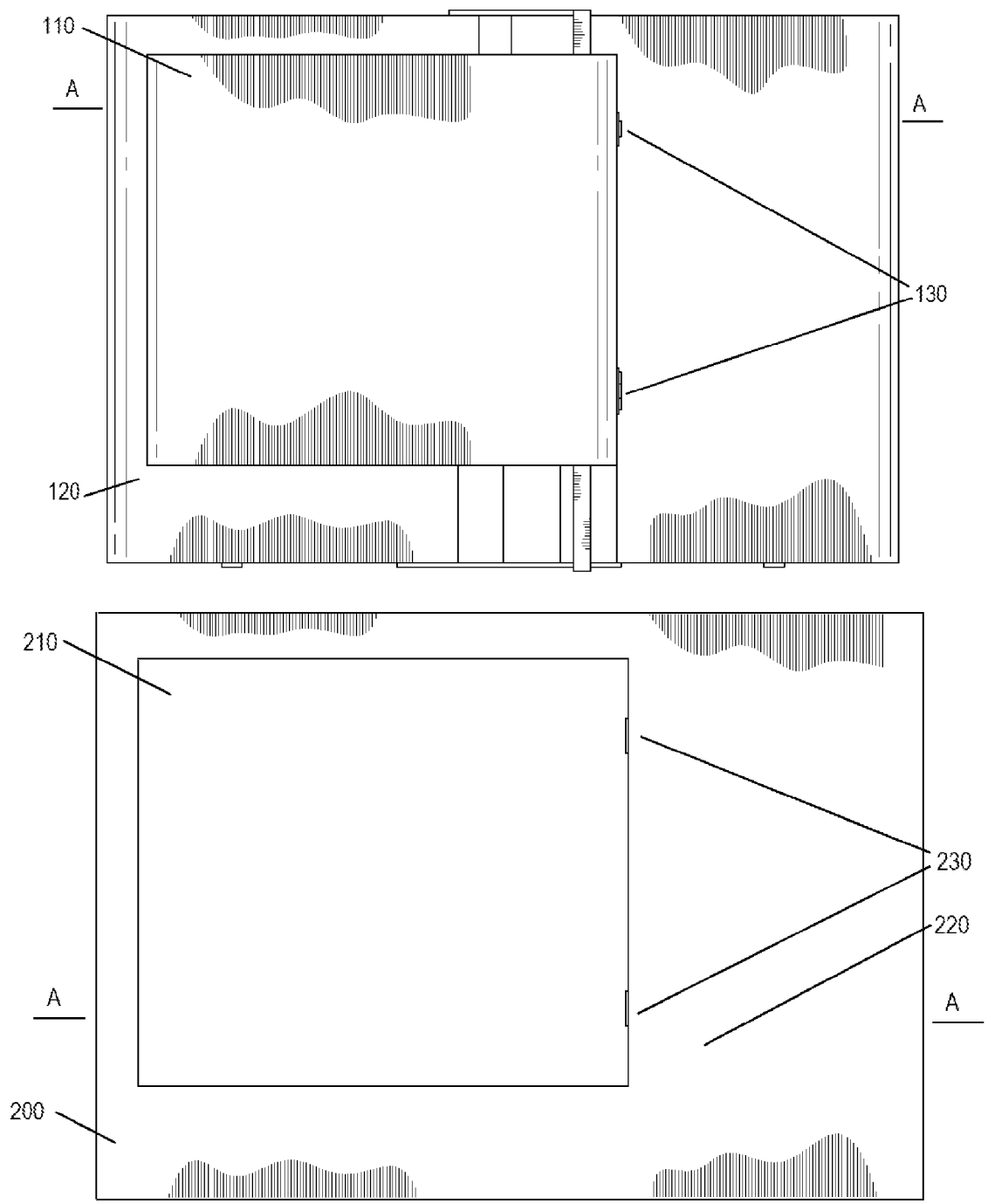
FIG. 2 is a top view of the battery and a bottom view of the electronic device, before the battery is installed to the electronic device.
Figure 3:
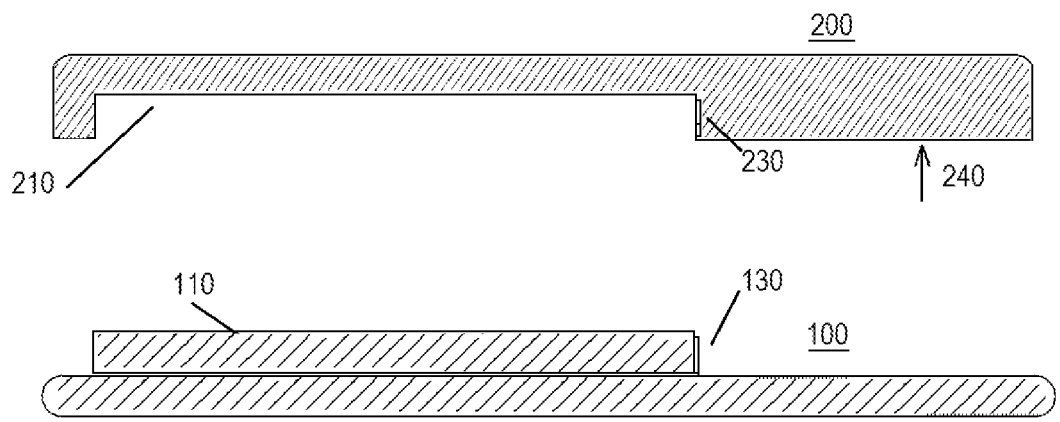
FIGS. 3 and 4 illustrate sectional views of the battery and the corresponding electronic device (along the line A-A in FIG. 2), respectively before and after the battery is installed to the electronic device.
Figure 4:
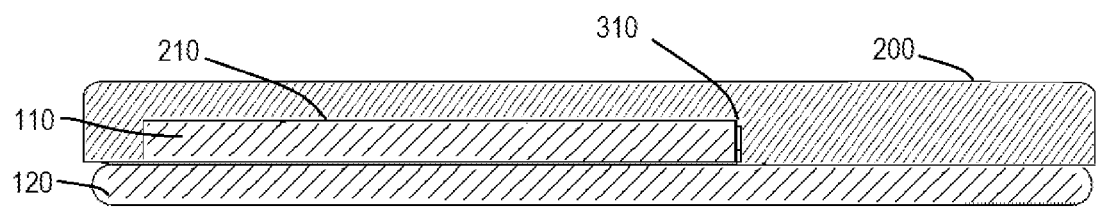

FIG. 1 illustrates an embodiment of a battery 100 for use in an electronic device 200 that has a user-accessible battery compartment 210 (see FIG. 2). FIG. 2 is a top view of the battery 100 and a bottom view of the electronic device 200, before the battery 100 is installed to the electronic device 200. FIGS. 3 and 4 are sectional views of the battery (along the line A-A in FIG. 2) and the corresponding electronic device 200, respectively before and after the battery 100 is installed to the electronic device 200.

The battery 100 includes two parts: a connection module 110 that is accommodatable in the battery compartment 210 of the electronic device 200 (see FIGS. 2 and 4), and an extension module 120 that is attached to and is in electrical connection with the connection module 110. As illustrated in FIG. 1, a bottom surface of the extension module 110 is attached to a top surface of the connection module 120. The extension module 120 is larger in size than the battery compartment 210 (see FIGS. 2 and 4). Thus, as illustrated in FIG. 4, when the battery 100 in installed to the electronic device 200, the connection module 110 is disposed in the battery compartment 210, and the extension module 120 covers the battery compartment 210 and a portion 220 of the electronic device 200 other than the battery compartment 210.

In the battery 100, the connection module 110 and the extension module 120 may be formed of one or more battery cells. For example, in the embodiment shown in FIG. 1, the connection module 110 is formed of one battery cell, and the extension modules 120 is formed of two electronically-connected battery cells 120A and 120B. A battery 100 with such a tri-cell design may be used, for example, in cellphones such as the Samsung Galaxy S III™. The battery 100 is so designed that, when it is installed to the cellphone 200, the battery cells 120A and 120B may use the space not only above the battery compartment 210, but also above other portions of the cellphone 200, such as the area in which the memory card (e.g. micro SD) or the sim card is located. Thus, as compared to a conventional battery that only occupies the battery compartment, the battery 100 of the invention maximizes the use of the space on the back of the cellphone, so as to increase the capacity of the battery 100 while still keeping the footprint of the battery 100 within the limits of the phone's absolute physical dimension. For example, the physical dimension of Galaxy S III™ is 136.6 mm (height)×70.6 mm (width)×8.6 mm (thickness). The battery 100 corresponding to Galaxy S III™ may have a footprint that is substantially equal to, or slightly less than, 136.6 mm (height)×70.6 mm (width). The physical thickness of the phone may increase once the battery 100 is installed thereto.

A battery of such a design may also be used in other electronic devices (e.g. Samsung Galaxy Note 2™ or Galaxy S IV™). Depending on the size of the device, and the size and location of the battery compartment, the size of the connection module 110, that of the connection module 120, and the relative position of the connection module 110 to the connection module 120 may differ for different electronic devices.

The connection module 110 has electrical terminals 130 formed at positions corresponding to terminals 230 of the battery compartment 210, so that the connection module 110 is in electrical connection with the electronic device 200 when the battery 100 is installed. In one embodiment as illustrated in FIG. 1, the battery cells 110, 120A and 120B are made out of aluminum, where the exterior of the cells serves as a positive electrical terminal, and terminals 130 are negative electrical terminals. The battery 100 may also includes plastic films or strips 140 that are used to isolate the battery cells and to protect the terminals of the battery.

In the embodiment as illustrated in FIGS. 1-4, the bottom surface of the extension module 120 is of a size substantially similar to that of a side 240 of the electronic device 200 through which the battery compartment 210 is accessible, so that the extension module 120 substantially covers the entire side of the electronic device 200 when the battery 100 is installed (see FIG. 4). The dimensions of the connection module 110 equal to dimensions of the battery compartment 210.

After the battery 100 is installed to the electronic device 200, a separate back cover may be additionally attached to the electronic device 200 to thereby cover the entire battery 100. Alternatively, the battery 100 may be securely attachable to the electronic device 200, and the extension module 120 thereof may have, at its back surface, a protective layer, such that the back surface of the extension module 120 serves as the back cover of the electronic device 200, and no separate back cover is necessary.

The battery 100 may additionally include an integrated circuit chip (not shown) for preventing the overcharging of the battery 100. The integrated circuit chip is in electrical connection with the terminals 130 and may be disposed to cover the terminals 130, so that when the battery 100 is being charged by a charging device (not shown), the terminals 130 of the battery 100 is in electrical connection with the terminals of the charging device via the integrated circuit chip, and the integrated circuit chip works to prevent the overcharging of the battery 100. When the battery 100 is installed to the cellphone 200 and charged via the cellphone 200, the integrated circuit chip is placed between, and electronically connects, the terminals 130 and the terminals 230 of the cellphone 200 (at which time a sectional view of the integrated circuit chip may be found at location 310 of FIG. 4), so as to control the current between the battery 100 and the cellphone 200. In other embodiments, the integrated circuit chip may be disposed at a location close to, but does not cover, the terminals 130 of the battery 100. The integrated circuit chip may have electrical terminals (e.g. copper connector plates) formed thereon. The terminals 230 of the battery 100 and the terminals of the charging device may be made in electrical connection with the integrated circuit chip via the electrical terminals of the integrated circuit chip.

In another embodiment of the invention, the capacity of the battery 100 may be further increased by stacking another extension module 120 onto the top surface of the extension module 120, and electrically connecting the two extension modules 120. The footprint of such a battery 100 is still within the absolute limits of the physical dimensions of the electronic devices. If necessary, more extension modules 120 may similarly be stacked to further increase the capacity of the battery.

Figure 5:
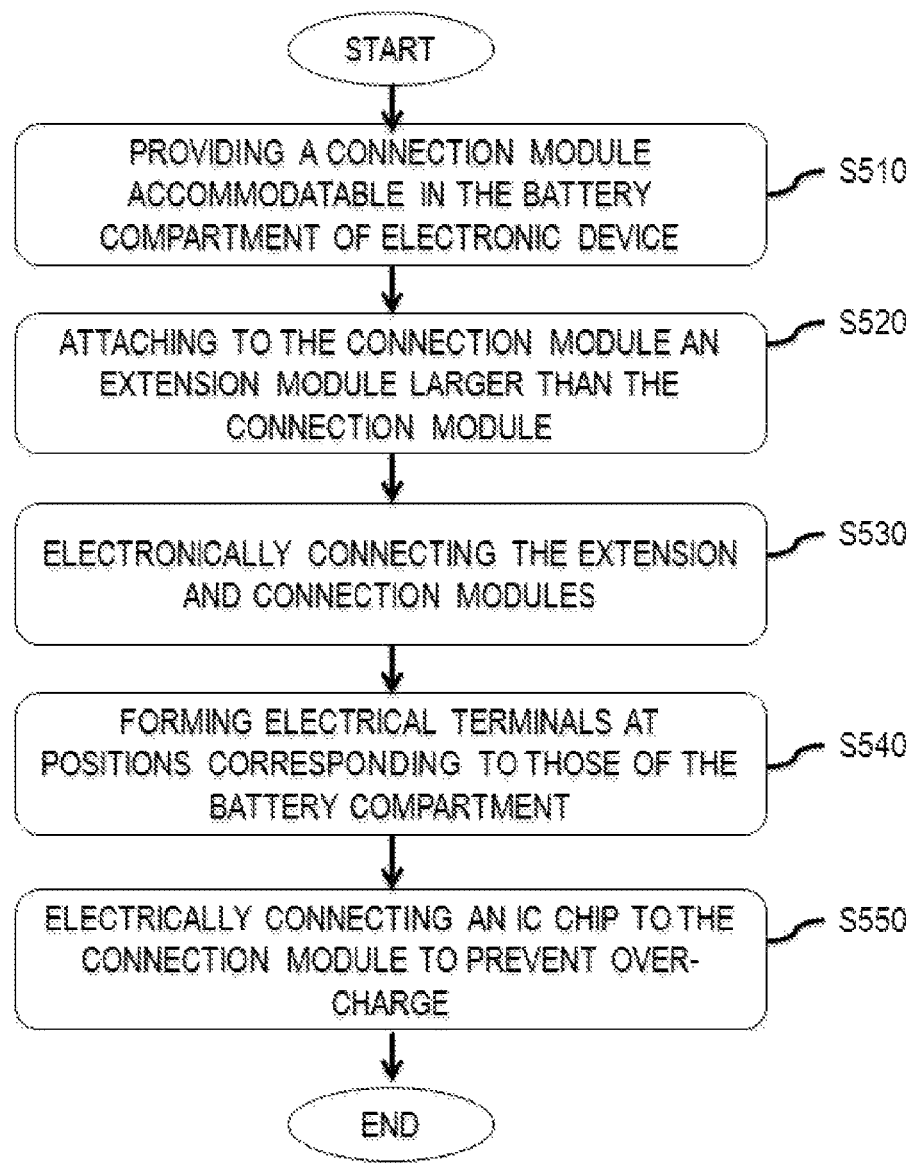
FIG. 5 is a flowchart illustrating a method of manufacturing a battery for use in an electronic device having a user-accessible battery compartment in one embodiment of the invention.

FIG. 5 is a flowchart illustrating a method of manufacturing a battery 100, in one embodiment of the invention, for use in an electronic device 200 having a user-accessible battery compartment 210. The method includes providing a connection module 110 accommodatable in the battery compartment 210 (step 510), attaching an extension module 120 to the connection module 110 (step 520), and electronically connecting the extension module 120 and the connection module 120 (step 530). The extension module 120 is larger than the battery compartment 210, such that, when the battery 100 in installed, the connection module 110 is disposed in the battery compartment 210, and the extension module 120 covers the battery compartment 210 and a portion of the electronic device 200 other than the battery compartment 210. The method may includes forming, on the connection module 110, electrical terminals 130 at positions corresponding to terminals 230 of the battery compartment 210, so that the connection module 110 is in electrical connection with the electronic device 200 (via an integrated circuit chip if one is formed to over the terminals 130) when the battery 100 is installed (step 540). The method may also include forming an integrated circuit chip to prevent the overcharging of the battery 100 (step 550).

In another embodiment of the invention, the method may additionally include stacking another extension module 120 (or even multiple such extension modules) onto the top surface of the extension module 120, and electrically connecting the two extension modules 120.

Figure 6:
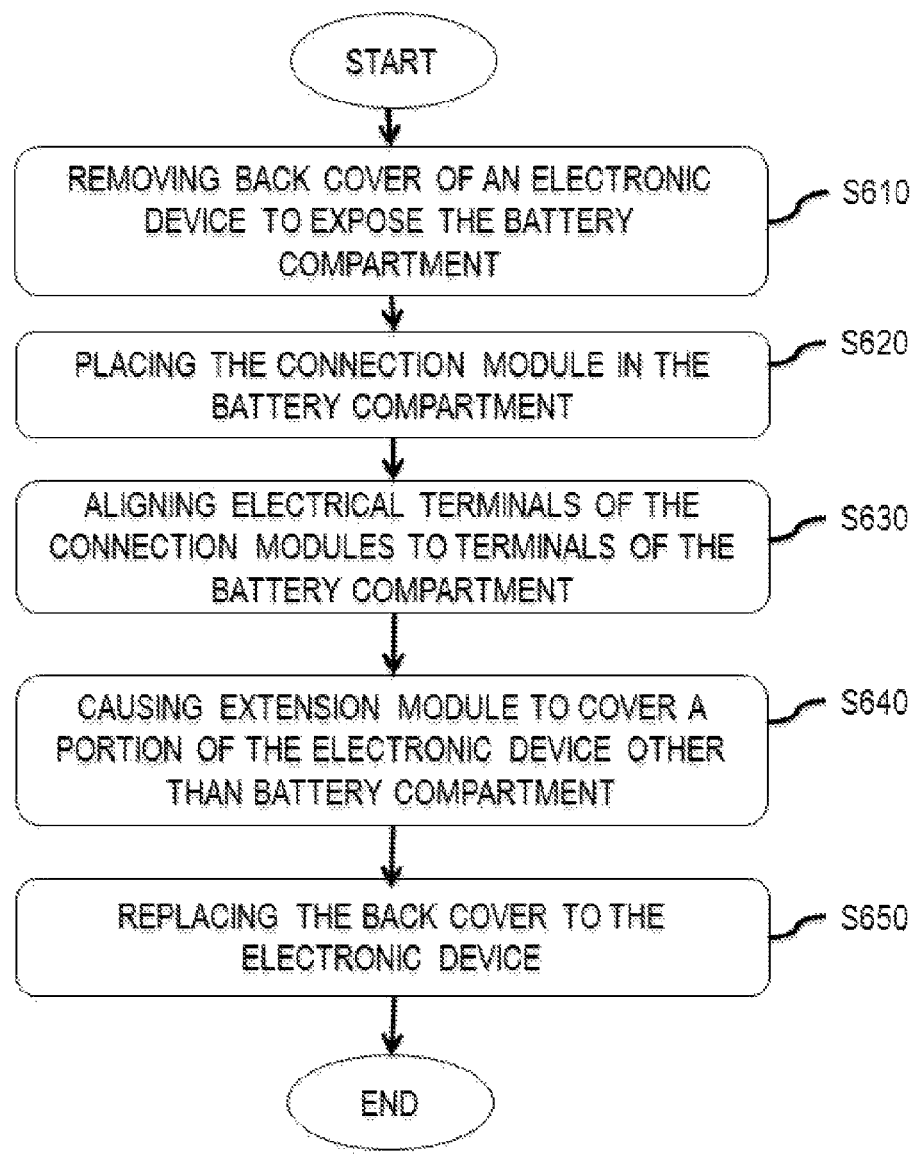
FIG. 6 is a flowchart illustrating a method of using a battery in an electronic device having a user-accessible battery compartment in one embodiment of the invention.

FIG. 6 is a flowchart illustrating, in one embodiment of the invention, a method of using a battery 100 in an electronic device 200 having a user-accessible battery compartment 210, where the battery 100 has a connection module 110 accommodatable in the battery compartment 210, and an extension module 120 attached to and in electrical connection with the connection module 110, the extension module 120 being larger than the battery compartment 210. The method includes removing a cover of the electronic device 200 to expose the battery compartment 210 (step 610), placing the connection module 110 in the battery compartment 210 (step 620), including aligning electrical terminals 130 of the connection module 120 to terminals 230 of the battery compartment 210, so as to electronically connect the battery 100 to the electronic device 200 (step 630), so as to cause the extension module 120 to cover the battery compartment 210 and a portion of the electronic device 200 other than the battery compartment 210 (step 640). The method may also include replacing the cover of the electronic device to cover the extension module (step 650).

It should be understood, that the invention is not necessarily limited to the specific process, arrangement, materials and components shown and described above, but may be susceptible to numerous variations within the scope of the invention.

What is claimed is:

1. A battery for use in an electronic device having a user-accessible battery compartment, comprising:
   a connection module accommodable in the battery compartment; and
   an extension module attached to and in electrical connection with the connection module, the extension module being larger than the battery compartment, such that, when the battery is installed, the connection module is disposed in the battery compartment, and the extension module covers the battery compartment and a portion of the electronic device other than the battery compartment, wherein
   each of the connection module and the extension module is a battery module that includes at least one battery cell.

2. The battery of claim 1, wherein the extension module includes two battery cells.

3. The battery of claim 1, wherein the connection module has electrical terminals formed at positions corresponding to terminals of the battery compartment, so that the connection module is in electrical connection with the electronic device when the battery is installed.

4. The battery of claim 1, wherein
   a bottom surface of the extension module is attached to a top surface of the connection module, and
   the bottom surface of the extension module is larger than the top surface of the connection module, and is larger than an opening of the battery compartment.

5. The battery of claim 4, wherein the bottom surface of the extension module is of a size substantially similar to that of a side of the electronic device through which the battery compartment is accessible, so that the extension module substantially covers the entire side of the electronic device when the battery is installed.

6. The battery of claim 1, wherein dimensions of the connection module equal to dimensions of the battery compartment.

7. The battery of claim 1, further comprising an integrated circuit chip that prevents overcharging of the battery.

8. A method of manufacturing a battery for use in an electronic device having a user-accessible battery compartment, comprising:
   providing a connection module accommodable in the battery compartment; and
   attaching an extension module to the connection module, and electronically connecting the extension and connection modules, wherein
   the extension module is larger than the battery compartment, such that, when the battery is installed, the connection module is disposed in the battery compartment, and the extension module covers the battery compartment and a portion of the electronic device other than the battery compartment, and
   each of the connection module and the extension module is a battery module that includes at least one battery cell.

9. The method of claim 8, further comprising manufacturing the extension module using two battery cells.

10. The method of claim 8, further comprising forming, on the connection module, electrical terminals at positions corresponding to terminals of the battery compartment, so that the connection module is in electrical connection with the electronic device when the battery is installed.

11. The method of claim 8, wherein the attaching includes attaching a bottom surface of the extension module to a top surface of the connection module, wherein the bottom surface of the extension module is larger than the top surface of the connection module, and is larger than an opening of the battery compartment.

12. The method of claim 11, wherein the bottom surface of the extension module is of a size substantially similar to that of a side of the electronic device through which the battery compartment is accessible, so that the extension module substantially covers the entire side of the electronic device when the battery is installed.

13. The method of claim 8, wherein dimensions of the connection module equal to dimensions of the battery compartment.

14. The method of claim 8, further comprising connecting the connection and extension modules to an integrated circuit chip, to thereby prevent overcharging of the battery.

* * * * *